United States Patent
Han et al.

(10) Patent No.: US 10,461,803 B1
(45) Date of Patent: Oct. 29, 2019

(54) METHOD FOR RENDEZVOUS OF UNLICENSED USERS HAVING MULTIPLE TRANSCEIVERS IN COGNITIVE RADIO NETWORKS

(71) Applicant: HOHAI UNIVERSITY, CHANGZHOU CAMPUS, Jiangsu (CN)

(72) Inventors: Guangjie Han, Jiangsu (CN); Aohan Li, Jiangsu (CN)

(73) Assignee: HOHAI UNIVERSITY, CHANGZHOU CAMPUS, Jiangsu (CN)

( * ) Notice: Subject to any disclaimer, the term of this patent is extended or adjusted under 35 U.S.C. 154(b) by 0 days.

(21) Appl. No.: 16/066,303

(22) PCT Filed: Mar. 13, 2017

(86) PCT No.: PCT/CN2017/000226
§ 371 (c)(1),
(2) Date: Jun. 27, 2018

(87) PCT Pub. No.: WO2018/126349
PCT Pub. Date: Jul. 12, 2018

(30) Foreign Application Priority Data

Jan. 4, 2017 (CN) .......................... 2017 1 0005859

(51) Int. Cl.
H04B 1/713 (2011.01)
H04B 1/7143 (2011.01)
H04W 16/14 (2009.01)

(52) U.S. Cl.
CPC .......... H04B 1/7143 (2013.01); H04W 16/14 (2013.01)

(58) Field of Classification Search
CPC .............................. H04B 1/7143; H04W 16/14
(Continued)

(56) References Cited

U.S. PATENT DOCUMENTS

| 8,644,290 B2* | 2/2014 | Chou | H04J 3/1647 370/329 |
| 2014/0307634 A1* | 10/2014 | Lee | H04W 16/14 370/329 |

(Continued)

FOREIGN PATENT DOCUMENTS

| CN | 104506261 | 4/2015 |
| CN | 106027118 | 10/2016 |

OTHER PUBLICATIONS

Rajib Paul and Young-June Choi, "Adaptive Rendezvous for Heterogeneous Channel Environments in Cognitive Radio Networks", IEEE Transactions on Wireless Communications, Nov. 2016, pp. 7753-7765.

(Continued)

Primary Examiner — Don N Vo
(74) Attorney, Agent, or Firm — JCIPRNET

(57) ABSTRACT

The present invention discloses a method for rendezvous of unlicensed users having multiple transceivers in cognitive radio networks, including four stages: an initial stage: setting an initial communication environment; a stage of selecting a rendezvous method: selecting a method for generating a channel hopping sequence according to the quantity of transceivers; a stage of generating a channel hopping sequence: using a single-transceiver rendezvous method or a multiple-transceiver rendezvous method to generate a channel hopping sequence; and a rendezvous stage: running, by an unlicensed user, on a corresponding channel and attempting to rendezvous with a destination node of the unlicensed user, where if rendezvous is achieved, the rendezvous process ends; and if rendezvous is not achieved, the rendezvous process continues until rendezvous is achieved. By using the present invention, the problem of rendezvous of unlicensed users equipped with different quantities of transceivers in heterogeneous cognitive radio networks is effectively resolved.

7 Claims, 4 Drawing Sheets

(58) Field of Classification Search
USPC .......................................................... 375/132
See application file for complete search history.

(56) References Cited

U.S. PATENT DOCUMENTS

| | | |
|---|---|---|
| 2015/0085817 A1 | 3/2015 | Liu et al. |
| 2016/0134396 A1* | 5/2016 | Guerreiro ............. H04L 5/0033 370/329 |
| 2018/0124611 A1* | 5/2018 | Moon ................... H04W 16/14 |

OTHER PUBLICATIONS

Lu Yu et al., "Multiple Radios for Fast Rendezvous in Cognitive Radio Networks", IEEE Transactions on Mobile Computing, Sep. 2015, pp. 1917-1931.

Lu Yu et al., "Adjustable Rendezvous in Multi-Radio Cognitive Radio Networks", IEEE Global Communications Conference (Globecom), Dec. 2015, pp. 1-7.

Zhiyong Lin et al., "Enhanced Jump-Stay Rendezvous Algorithm for Cognitive Radio Networks", IEEE Communications Letters, Sep. 2013, pp. 1742-1745.

Hai Liu et al., "Jump-Stay Rendezvous Algorithm for Cognitive Radio Networks", IEEE Transactions on Parallel and Distributed Systems, Oct. 2012, pp. 1867-1881.

Kong De-Kai et al., "Study on asynchronous rendezvous algorithms based on channel hopping sequence in cognitive radio networks." Computer Engineering & Science, Oct. 2014, pp. 1872-1879.

Chuan Zhu et al., "A Tree-Cluster-Based Data-Gathering Algorithm for Industrial WSNs With a Mobile Sink", IEEE Access, Apr. 22, 2015, pp. 381-396.

* cited by examiner

US 10,461,803 B1

METHOD FOR RENDEZVOUS OF UNLICENSED USERS HAVING MULTIPLE TRANSCEIVERS IN COGNITIVE RADIO NETWORKS

CROSS-REFERENCE TO RELATED APPLICATION

This application is a 371 application of the international PCT application serial no. PCT/CN2027/000226, filed on Mar. 13, 2017, which claims the priority benefit of China application no. 201710005859.5, filed on Jan. 4, 2017. The entirety of each of the above-mentioned patent applications is hereby incorporated by reference herein and made a part of this specification.

BACKGROUND OF THE INVENTION

Field of the Invention

The present invention relates to cognitive radio network technologies, and in particular, to a method for rendezvous of unlicensed users having multiple transceivers in cognitive radio networks.

Description of Related Art

In recent years, with the rapid development of wireless devices and applications in unlicensed frequency bands, the requirements for unlicensed spectrums grow vigorously. However, fixed spectrum allocation policies become the bottlenecks for more effective utilization of spectrum resources. A large part of licensed spectrums are not fully utilized in the fixed spectrum allocation policies, whereas communication is severely congestive in unlicensed frequency bands. To utilize spectrum resources more effectively, cognitive radio technologies emerge accordingly. In cognitive radio networks, unlicensed users can use licensed spectrums without interfering with normal communication of licensed users.

Before data transmission, an unlicensed user is required to implement a channel rendezvous process first. In the channel rendezvous process, a source node and a destination node of the source node in communication attempt to run on the same available spectrum for information exchange to establish a communication link. Therefore, the channel rendezvous process is essential for connections in cognitive radio networks.

A channel rendezvous method may include infrastructure-based rendezvous and infrastructure-less rendezvous. In an infrastructure-based rendezvous system, a centralized controller directly controls an unlicensed user to access an available licensed channel. Such a rendezvous system is simple to implement and achieves better controlled spectrums. However, the centralized controller is a massively expensive infrastructure and its expandability is limited to a certain extent. In addition, the centralized controller may easily cause a single point failure. A centralized controller is not provided in an infrastructure-less rendezvous system, and unlicensed users need to complete a rendezvous process independently. In the infrastructure-less rendezvous system, there may further be two methods for rendezvous of unlicensed users: a method for achieving rendezvous by using a common control channel and a method for achieving rendezvous by using a channel hopping sequence. In the method for achieving rendezvous by using a common control channel, all unlicensed users are required to use the same common control channel. However, since available channels for unlicensed users change with space in cognitive radio networks, it is impractical to achieve rendezvous by using the same common available channel. In addition, a common control channel is vulnerable to interference and attacks. In the method for achieving rendezvous by using a channel hopping sequence, an intelligent rendezvous algorithm may be designed to enable an unlicensed user to rendezvous with a destination node of the unlicensed user on a common available channel within a finite time. When a channel hopping sequence is used to achieve rendezvous, an unlicensed user cannot obtain information about other unlicensed users, and the unlicensed users do not agree on a spectrum to which the unlicensed users are to switch at a time point. Therefore, it is a huge challenge for design of a rendezvous algorithm. In addition, distributed heterogeneous cognitive radio networks further face many other challenges in the design of a rendezvous algorithm. For example, there is no synchronization clock between unlicensed users, different unlicensed users have different perception capabilities and perception ranges, ID information of an anonymous unlicensed user cannot be used, and different roles (a sender or a receiver) cannot be allocated to different unlicensed users before a rendezvous process is implemented.

Currently, in most researches on achieving rendezvous based on a channel hopping sequence, it is assumed that an unlicensed user is equipped with only one transceiver, and the unlicensed user can run on only one channel in each timeslot. However, if an unlicensed user is equipped with multiple transceivers, the unlicensed user can run on multiple channels simultaneously in one timeslot, so that the time-to-rendezvous of unlicensed users can be significantly reduced. Moreover, since transceivers are inexpensive, it is more feasible to consider unlicensed users equipped with any quantities of transceivers in the research on the problem of rendezvous of unlicensed users.

Currently, related research documents concerning the problem of rendezvous of unlicensed users in cognitive radio networks are as follows:

1. The problem of rendezvous using multiple radio interfaces is researched in the article "Adaptive Rendezvous for Heterogeneous Channel Environment in Cognitive Radio Networks" published by Rajib Paul et al. in *IEEE TRANSACTIONS ON Wireless Communications,* 2016. When unlicensed users can use multiple radio interfaces, the probability of rendezvous increases. The article also provides an adaptive rendezvous method that is applicable to multiple interfaces and in which different unlicensed users have different available spectrums. A jump-pattern in the adaptive rendezvous method can be adaptively adjusted according to different channel conditions, and it can be ensured that unlicensed users can rendezvous with each other. A channel hopping sequence generated by using an adaptive rendezvous algorithm includes a hopping period and a wait period. In the wait period, an unlicensed user stays on a specific channel. In the hopping period, an unlicensed user hops on different channels according to an order in an available channel set that is arranged by the unlicensed user according to channel quality. When an unlicensed user is equipped with multiple radio interfaces, available channels are allocated to different interfaces, and channels available to each interface are a subset of all available channels of the unlicensed user. However, in the design of an algorithm, it is assumed that different unlicensed users are equipped with the same quantity of interfaces. In heterogeneous cognitive radio networks, different unlicensed users may possess different quantities of radio interfaces. Therefore, the adaptive rendezvous algorithm is not applicable to heterogeneous cognitive radio networks.

2. The problem of rendezvous of unlicensed users having different quantities of transceivers is researched in the article "Multiple Radios for Fast Rendezvous in Cognitive Radio Networks" published by Lu Yu et al. in *IEEE TRANSACTIONS ON MOBILE COMPUTING*, 2015. The article provides a Role-Based Parallel Sequence (RPS) rendezvous method. In the RPS rendezvous method, multiple transceivers and available channels are used to design a channel hopping sequence. The basic idea of the article is: One transceiver of an unlicensed user is set as a dedicated transceiver, and the transceiver stays on one specific channel. The remaining transceivers are set as normal transceivers, and the normal transceivers hop on available channels in a parallel sequence manner. By using the RPS rendezvous method, an unlicensed user can rendezvous with a destination node of the unlicensed user within a finite time. In the RPS rendezvous method, it is assumed that unlicensed users are equipped with one or more transceivers. However, when one of the unlicensed users is equipped with one transceiver, the maximum time-to-rendezvous in the RPS rendezvous method is infinite. That is, in this case, two unlicensed users may never rendezvous by using the RPS rendezvous method. In addition, when an unlicensed user uses an RPS rendezvous algorithm to attempt to rendezvous with a destination node of the unlicensed user, different transceivers of the same unlicensed user may run on the same channel at a time point. The characteristic of multiple transceivers of an unlicensed user is not fully utilized in the RPS rendezvous method.

3. An adjustable multiple-transceiver rendezvous method called AMRR is provided in the article "Adjustable Rendezvous in Multi-Radio Cognitive Radio Networks" published by Lu Yu et al. in *Proceedings of the IEEE Global Communications Conference*, 2015. In the AMRR rendezvous method, only available channel information of an unlicensed user is used to generate a channel hopping sequence. In the AMRR rendezvous method, transceivers equipped to an unlicensed user can be divided into two parts: stay transceivers and hopping transceivers. The stay transceivers stay on a specific channel. The hopping transceivers hop in parallel on different available channels. It is assumed in the AMRR rendezvous method that each unlicensed user is equipped with more than one transceiver; therefore, the AMRR rendezvous method is not applicable when an unlicensed user is equipped with one transceiver. In addition, when an unlicensed user uses the AMRR rendezvous method to generate a channel hopping sequence, different transceivers of the unlicensed user may run on the same channel at a time point, and thus the characteristic of multiple transceivers is not fully utilized.

4. An Enhanced Jump-Stay (EJS) method is provided in the article "Enhanced Jump-Stay Rendezvous Algorithm for Cognitive Radio Networks" published by Zhiyong Lin et al. in *IEEE COMMUNICATION LETTERS*, 2013. In the EJS method, a channel hopping sequence is generated in rounds. The channel hopping sequence in each round includes two patterns: a jump-pattern and a stay-pattern. The length of the jump-pattern is 3P timeslots, and the length of the stay-pattern is P timeslots, P being a minimum prime number not less than the quantity of licensed channels. In the jump-pattern, an unlicensed user keeps hopping on available licensed channels. In the stay-pattern, the unlicensed user stays on one specific available licensed channel. Compared with the JS method, the EJS method reduces the maximum time-to-rendezvous and the expected time-to-rendezvous. However, the EJS method is only applicable when an unlicensed user is equipped with one transceiver.

5. A jump-stay channel-hopping method is provided in the article "Jump-Stay Rendezvous Algorithm for Cognitive Radio Networks" published by Hai Liu et al. in *IEEE TRANSACTIONS ON PARALLEL AND DISTRIBUTED SYSTEMS*, 2012. In the Jump-stay channel-hopping method, a channel hopping sequence is generated in rounds, and each round consists of a jump-pattern and a stay-pattern. Compared with an existing channel-hopping method, this method has the best performance in multiple scenarios. However, this method is also applicable only when an unlicensed user is equipped with one transceiver.

Therefore, the problems that generally exist in the methods for rendezvous of unlicensed users in current cognitive radio networks are as follows:

1. In most articles, it is considered that an unlicensed user is equipped with only one transceiver. That is, the unlicensed user can run on only one available spectrum at a time point, and the time-to-rendezvous is relatively long.

2. In most articles concerning that an unlicensed user is equipped with multiple transceivers, it is only considered that an unlicensed user is equipped with more than one transceiver. However, in heterogeneous cognitive radio networks, an unlicensed user may be equipped with different quantities of transceivers, including only one transceiver. When an unlicensed user is equipped with one transceiver, the rendezvous method is no longer applicable.

3. Multiple transceivers of an unlicensed user are not fully utilized. In most rendezvous methods, different transceivers of one unlicensed user may run on the same channel at a time point. The multiple transceivers are not utilized more effectively to reduce the time-to-rendezvous.

4. In most articles, the same channel quality is assumed in the design of a channel hopping sequence. However, in an actual communication environment, the channel quality may be different.

SUMMARY OF THE INVENTION

The objective of the present invention is to resolve the deficiencies that exist in methods for rendezvous of unlicensed users in current cognitive radio networks. The present invention provides a method for rendezvous of unlicensed users having multiple transceivers in cognitive radio networks. According to different quantities of transceivers that an unlicensed user is equipped with, two rendezvous methods are included: a single- transceiver rendezvous method and a multiple-transceiver rendezvous method. An unlicensed user equipped with only one transceiver selects the single-transceiver rendezvous method to generate a channel hopping sequence. An unlicensed user equipped with multiple transceivers selects the multiple-transceiver rendezvous method to generate a channel hopping sequence. The present invention is applicable to rendezvous of unlicensed users equipped with any quantities of transceivers.

Technical solution: To achieve the foregoing objective, the present invention adopts the following technical solution:

The innovative point of the method for rendezvous of unlicensed users having multiple transceivers in cognitive radio networks is that the method includes four stages: an initial stage, a stage of selecting a rendezvous method, a stage of generating a channel hopping sequence, and a rendezvous stage.

In the initial stage, an initial environment is set for the method for rendezvous of unlicensed users. An initial timeslot t=1 is set, an initial channel index $i_0$ is randomly selected from [1, $|C_a|$], one channel index value less than P is randomly selected from $C_a$ as a hopping interval s, and $C_a$ and N are arranged in order according to channel quality, where $N=\{c_1, c_2, \ldots, c_{|N|}\}$ is a licensed channel set, $C_a \in N$ is an available channel set of an unlicensed user a, $|C_a|$ is the quantity of available channels of the unlicensed user a, and P is a minimum prime number not less than the quantity of licensed channels $|N|$.

In the stage of selecting a rendezvous method, an unlicensed user selects a corresponding rendezvous method according to the quantity of transceivers that the unlicensed user is equipped with. When the unlicensed user is equipped with one transceiver, the unlicensed user selects the single-transceiver rendezvous method to generate a channel hopping sequence. When an unlicensed user is equipped with more than one transceiver, the unlicensed user selects the multiple-transceiver rendezvous method to generate a channel hopping sequence.

In the stage of generating a channel hopping sequence, the unlicensed user generates a channel hopping sequence by using the single-transceiver rendezvous method or the multiple-transceiver rendezvous method.

In the single-transceiver rendezvous method, a channel hopping sequence is generated in rounds. The length of a channel hopping sequence in each round is 5P timeslots, where the duration of a jump-pattern is 2P timeslots, the duration of a stay-pattern 1 is P timeslots, and the duration of a stay-pattern 2 is 2P timeslots.

Specific steps of the single-transceiver rendezvous algorithm are as follows:

Step 1: adjustment of an initial channel index: when a new round of a channel hopping sequence begins, that is, when y=(t−1)mod 5P=0, adjusting an initial channel index according to i=($i_0$+n), where n=(t−1)/5P, and t is a $t^{th}$ timeslot in the channel hopping sequence;

Step 2: generation of a channel hopping sequence in the jump-pattern with the length of 2P timeslots: when t'<2P, generating a channel index of a channel hopping sequence in the jump-pattern by using a formula j=((i+t'·s−1)mod P)+1 in the single-transceiver rendezvous method, where t'=y=(t−1)mod 5P;

Step 3: generation of a channel hopping sequence in the stay-pattern 1 with the length of P timeslots: when 2P≤t'<3P, staying on a channel whose channel index is s in the single-transceiver rendezvous algorithm, that is, j=s and $S_a^t=c_j$, where $S_a^t$ is a channel on which an unlicensed user a runs in a $t^{th}$ timeslot, and $c_j$ is a $j^{th}$ channel in N;

Step 4: generation of a channel hopping sequence in the stay-pattern 2 with the length of 2P timeslots: when t'≥3P, calculating a channel index in the stay-pattern 2 according to j=n−1 in the single-transceiver rendezvous algorithm;

Step 5: reallocation of a channel index: when the value of the channel index in the jump-pattern generated in step 2 or in the stay-pattern 2 generated in step 4 is j>$|N|$, replacing j with an index value of a $(((j−1) \mod |N|)+1)^{th}$ channel in N; and if j≤$|N|$, keeping j unchanged;

Step 6: channel substitution: if a licensed channel corresponding to the value of the channel index j generated after step 5 is an unavailable channel for the unlicensed user a, that is, $c_j \notin C_a$, substituting the licensed channel corresponding to the channel index j with a $((j−1) \mod |C_a|+1)^{th}$ channel in $C_a$, so that $S_a^t = C_{((j-1) \mod |C_a|+1)}$; and if $c_j \in C_a$, $S_a^t = c_j$; and Step 7: a stage of returning a generated channel: returning an element $S_a^t$ in a channel hopping sequence S of the unlicensed user a, where $S=\{S_a^1, S_a^2, \ldots, S_a^t, \ldots S_a^P\}$.

In the multiple-transceiver rendezvous method, a channel hopping sequence is also generated in rounds. The length of a channel hopping sequence in each round is $$w = \left\lceil \frac{|C_a| - (m-k)}{k} \right\rceil$$

timeslots, where m is the quantity of transceivers of an unlicensed user a, and k is the quantity of hopping transceivers. Specific steps of the multiple-transceiver rendezvous method are as follows:

Step 1: an initialization stage: initializing an element $S_a^t = \emptyset$ in a channel hopping sequence S, where $S=\{S_a^1, S_a^2 \ldots S_a^t\}$, $S_a^t$ is a channel on which the unlicensed user a runs in a $t^{th}$ timeslot, $S_a^t = \{S_a^{1t}, S_a^{2t}, \ldots, S_a^{xt}, \ldots S_a^{mt}\}$, and $S_a^{xt}$ is a channel on which an $x^{th}$ transceiver of the unlicensed user a runs in the $t^{th}$ timeslot;

Step 2: determination of a relationship between the quantity of available channels of an unlicensed user and the quantity of transceivers of the unlicensed user: if $|C_a| \le m$, and the transceivers of the unlicensed user are all stay transceivers, calculating, by each transceiver, a channel index h of a channel on which the transceiver stays according to h=(q−1)mod $|C_a|$+1, where $S_a^{qt} = C_h$, q=1 to m represents a $q^{th}$ transceiver of the unlicensed user, and $C_h$ is an $h^{th}$ channel in $C_a$; and if $|C_a|$>m, generating a channel hopping sequence $S_a^t$ according to step 3 to step 6;

Step 3: calculation of the length of a channel index sequence in each round according to a formula $$w = \left\lceil \frac{|C_a| - (m-k)}{k} \right\rceil;$$

Step 4: a process of generating a channel hopping sequence by a stay transceiver: generating, by an $i^{th}$ stay transceiver of the unlicensed user, an index of a channel hopping sequence according to $$h = \left( \left\lfloor \frac{t-1}{w} \right\rfloor \cdot (m-k) + i - 1 \right) \mod |C_a| + 1,$$

where $S_a^{it} = C_h$;

Step 5: a channel allocation process of a hopping transceiver: determining whether the timeslot t is the beginning of a new round of a channel hopping sequence, that is, whether (t−1)mod w is 0, where if (t−1)mod w is 0, channel allocation is performed on an available channel set except a set of channels on which a stay transceiver stays, that is, $C'_a = C_a/C_h$, and elements in $C'_a$ are allocated evenly to k hopping transceivers, $C_h$ being a set of channels on which the stay transceiver stays in the $t^{th}$ timeslot; and if (t−1)mod w is not 0, the process directly enters step 6;

Step 6: a process of generating a channel hopping sequence by a hopping transceiver: generating, by an $i^{th}$ hopping transceiver of the unlicensed user, an index of a channel hopping sequence of the $i^{th}$ hopping transceiver according to h=(t−1)mod $|C_a^i|$+1, where $S_a^{it} = C_a^{ih}$, $C_a^i$ is a set of available channels allocated to the $i^{th}$ hopping transceiver, $|C_a^i|$ is the quantity of available channels allocated to the $i^{th}$ hopping transceiver, and $C_a^{ih}$ is an $h^{th}$ channel in $C_a^i$; and Step 7: a stage of returning a channel hopping sequence value: returning an element $S_a^t$ in the channel hopping sequence.

Specific steps of the channel allocation process in step 5 of the multiple-transceiver rendezvous method are as follows:

Step 1: an initialization stage: initializing $C'_a = \emptyset$ and $j = m-k+1$, where $C'_a = \{C_a^1, C_a^2, \ldots, C_a^m\}$, and $C_a^j$ is a set of available channels allocated to a $j^{th}$ hopping transceiver;

Step 2: calculation of a set of channels allocated to a $j^{th}$ transceiver: initializing $q=0$ and $C_a^j = \emptyset$, and when $q=0$ to $(w-1)$ and $|C'_a| - (j - (m-k+1)(k+1) - q) > 0$, allocating elements in $C'_a$ evenly to the $j^{th}$ hopping transceiver according to a formula $C_a^j = C_a^j \cup C'_{|C'_a| - (j - (m-k+1)(k+1) - q)}$, where $C'_{|C'_a| - (j - (m-k+1)(k+1) - q)}$ is a $(|C'_a| - (j - (m-k+1)(k+1)))^{th}$ channel in $C'_a$, and $|C'_a|$ is the quantity of channels in $C'_a$; and Step 3: a stage of returning a set of allocated channels: returning $C''_a$.

In the rendezvous stage, an unlicensed user hops or stays on a channel corresponding to the channel hopping sequence generated in the stage of generating a channel hopping sequence and attempts to rendezvous with a destination node of the unlicensed user; if rendezvous is achieved, the rendezvous process ends; and if rendezvous is not achieved, the rendezvous process continues until rendezvous with a destination node of the unlicensed user is achieved.

The foregoing process of rendezvous of unlicensed users having multiple transceivers in cognitive radio networks is briefly summarized as follows: First, an initial environment is set for the method for rendezvous of unlicensed users. That is, an initial timeslot $t=1$ is set, an initial channel index $i_0$ is randomly selected from $[1, |C_a|]$, one channel index value less than P is randomly selected from $C_a$ as a hopping interval s, and $C_a$ and N are arranged in order according to channel quality. Next, a channel-sequence generation method is selected according to the quantity of transceivers that an unlicensed user is equipped with: if the unlicensed user is equipped with only one transceiver, the single-transceiver rendezvous method is selected to generate a channel hopping sequence; and if the unlicensed user is equipped with more than one transceiver, the multiple-transceiver rendezvous method is selected to generate a channel hopping sequence. Then, a channel hopping sequence is generated by using the single-transceiver rendezvous method or the multiple-transceiver rendezvous method. Eventually, the unlicensed user hops or stays on a channel corresponding to the channel hopping sequence generated in the stage of generating a channel hopping sequence and attempts to rendezvous with a destination node of the unlicensed user; if rendezvous is achieved, the rendezvous process ends; and if rendezvous is not achieved, the rendezvous process continues until rendezvous with a destination node of the unlicensed user is achieved.

Compared with the existing rendezvous methods, the present invention has the following positive effects:

(1) The present invention is applicable to rendezvous of unlicensed users equipped with any quantities of transceivers. Rendezvous of unlicensed users within a finite time can be ensured in all communication scenarios.

(2) The characteristic of multiple transceivers is considered in the present invention. It can be ensured that different transceivers of an unlicensed user run on different available channels in the same timeslot. The characteristic of multiple transceivers is fully utilized to reduce the time-to-rendezvous.

(3) Channel quality is considered in the present invention. In a channel hopping sequence generated by an unlicensed user, an available channel with better quality appears more often. Therefore, it is more probable for an unlicensed user to rendezvous with a destination node of the unlicensed user on a channel with better channel quality, so that the network performance is improved.

DETAILED DESCRIPTION OF THE INVENTION

The present invention is further described in detail below with reference to the accompanying drawings.

Figure 1:
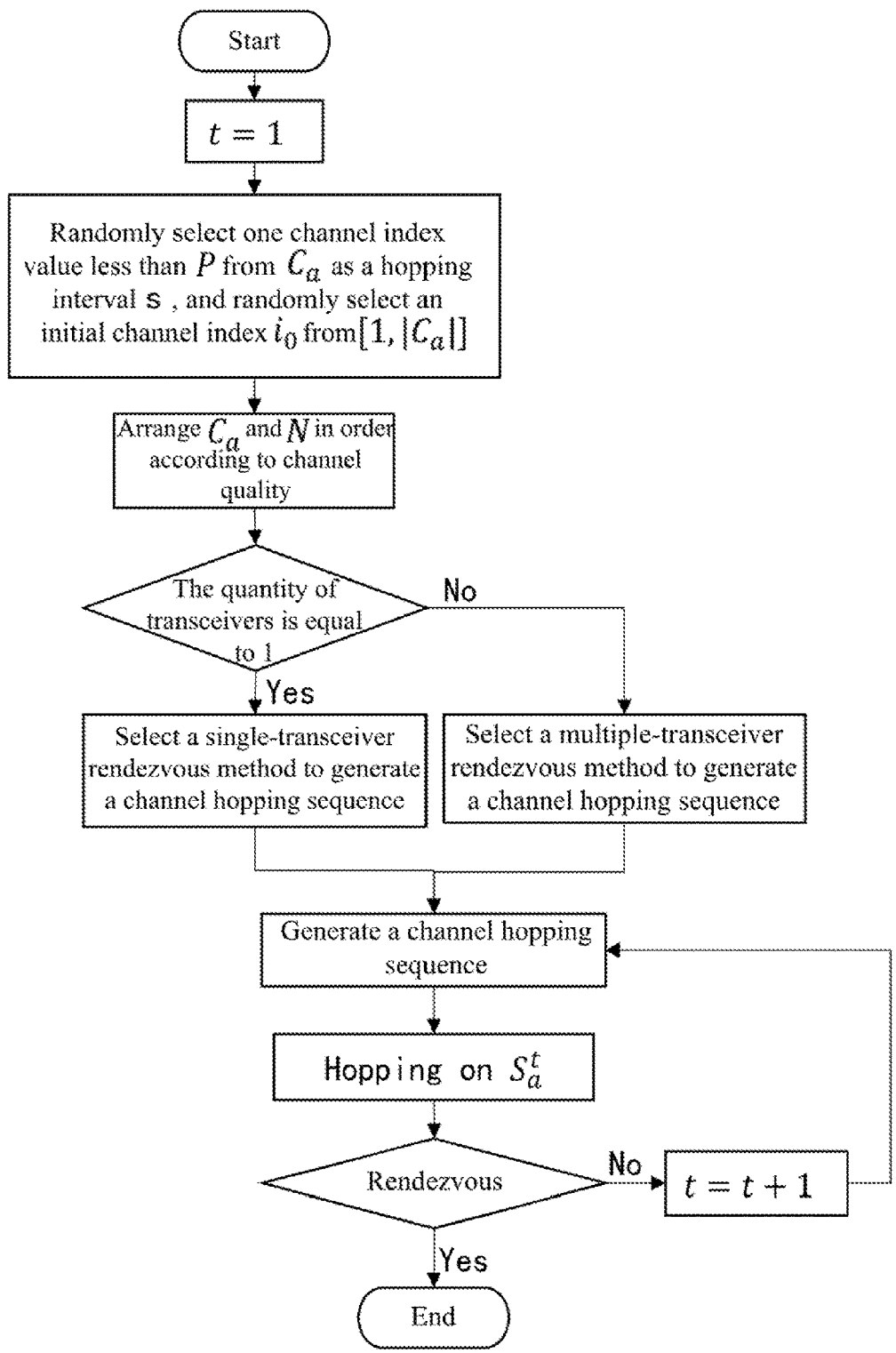
FIG. 1 is a flowchart of a method for rendezvous of unlicensed users having multiple transceivers in cognitive radio networks according to the present invention.

As shown in FIG. 1, a method for rendezvous of unlicensed users having multiple transceivers in cognitive radio networks according to the present invention mainly includes four stages.

The first stage is an initial stage: setting an initial environment for the method for rendezvous of unlicensed users; and setting an initial timeslot $t=1$, randomly selecting an initial channel index $i_0$ from $[1, |C_a|]$, randomly selecting one channel index value less than P from $C_a$ as a hopping interval s, and arranging $C_a$ and N in order according to channel quality, where $N = \{c_1, c_2, \ldots, c_{|N|}\}$ is a licensed channel set, $C_a \in N$ is an available channel set of an unlicensed user a, $|C_a|$ is the quantity of available channels of the unlicensed user a, and P is a minimum prime number not less than the quantity of licensed channels $|N|$.

The second stage is a stage of selecting a rendezvous method: selecting, by an unlicensed user, a rendezvous method according to the quantity of transceivers that the unlicensed user is equipped with; if the quantity of transceivers is 1, selecting a single-transceiver rendezvous method to generate a channel hopping sequence; and if the quantity of transceivers is not 1, selecting a multiple-transceiver rendezvous method to generate a channel hopping sequence.

The third stage is a stage of generating a channel hopping sequence: according to different quantities of transceivers that the unlicensed user is equipped with, generating a channel hopping sequence by using the single-transceiver rendezvous method or the multiple-transceiver rendezvous method.

The fourth stage is a rendezvous stage: hopping or staying, by the unlicensed user, on a corresponding channel according to the channel sequence generated in the stage of generating a channel sequence, and attempting to rendezvous with a destination node of the unlicensed user on the channel, where if rendezvous is achieved, the rendezvous process ends; and if rendezvous is not achieved, the rendezvous process continues until rendezvous is achieved.

Figure 2:
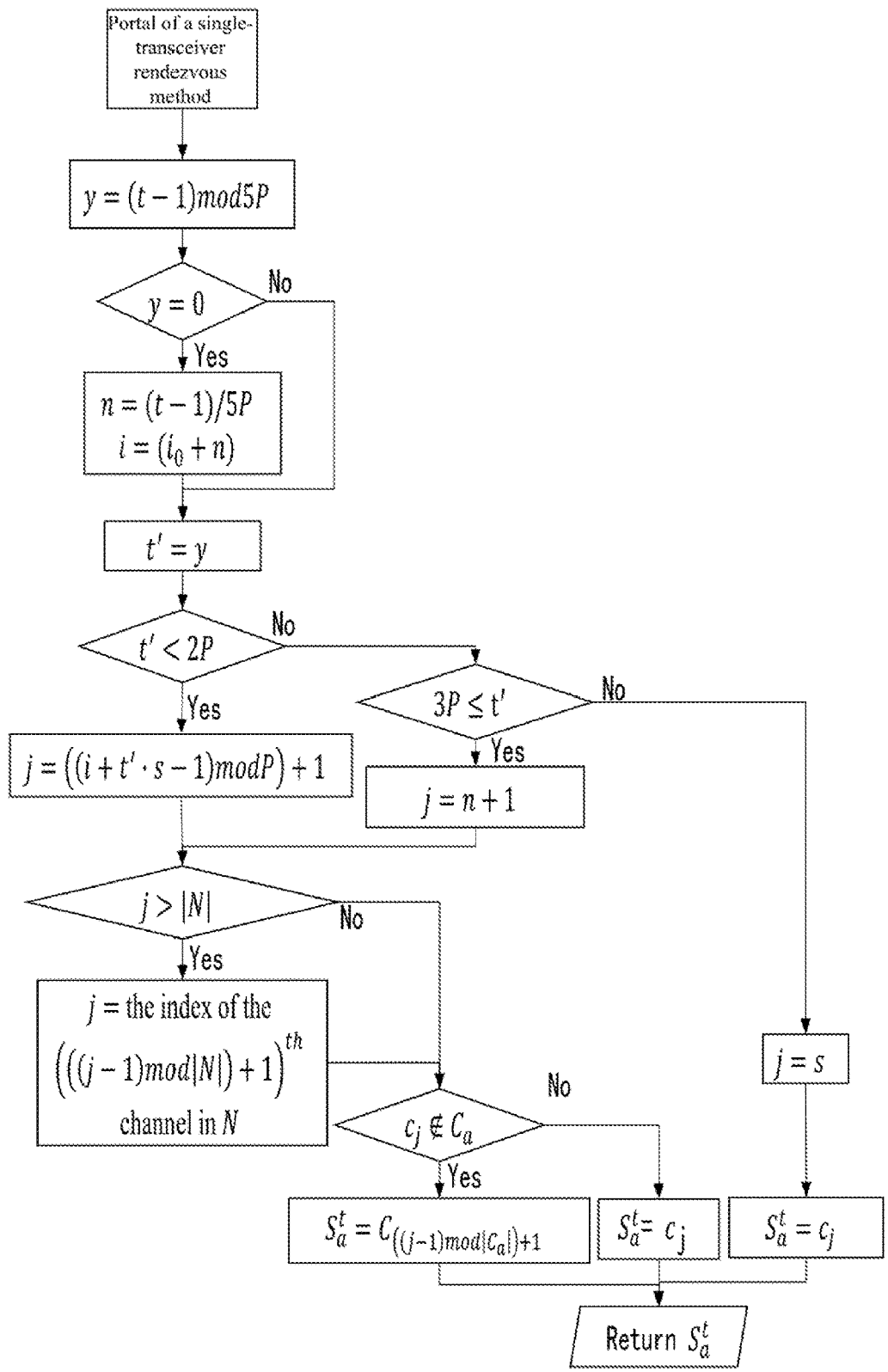
FIG. 2 is a flowchart of generating a channel hopping sequence by using a single-transceiver rendezvous method.

As shown in FIG. 2, a specific process of generating a channel hopping sequence by using the single-transceiver rendezvous method may be summarized as follows. It is first determined whether a new round begins, that is, whether y=(t−1)mod 5P is 0. If y=(t−1)mod 5P is 0, an initial channel index is adjusted according to i=(i$_0$+n), where n=(t−1)/5P, and t is a t$^{th}$ timeslot of a channel hopping sequence. Then, it is determined whether t' is less than 2P. If t'<2P, a channel index of a channel hopping sequence in a jump-pattern is generated by using a formula j=((i+t'·s−1)mod P)+1 in the single-transceiver rendezvous algorithm, where t'=y=(t−1) mod 5P. If t'≥2P, it is determined whether t' satisfies t'≥3P. If t' does not satisfy t'≥3P, a channel index j of a channel hopping sequence in a stay-pattern 1 is generated according to j=s, that is, j=s and $S_a^t$=$c_j$, where $S_a^t$ is a channel on which an unlicensed user a runs in a t$^{th}$ timeslot, and $c_j$ is a j$^{th}$ channel in N. If t' satisfies t'≥3P, a stay channel index in a stay-pattern 2 is calculated according to j=n+1 in the single-transceiver rendezvous algorithm. It is then determined whether the channel index j in the jump-pattern and the stay-pattern 2 is greater than |N|. If j>|N|, j is replaced with an index value of a (((j−1)mod |N|)+1)$^{th}$ channel in N. If j≤|N|, j is kept unchanged. Eventually, it is determined whether a licensed channel corresponding to the channel index j after reallocation of a channel index is an available channel for the unlicensed user a. If the licensed channel is an unavailable channel, that is, $c_j \notin C_a$, the licensed channel corresponding to the channel index j is substituted with a ((j−1)mod |$C_a$|+1)$^{th}$ channel in $C_a$, so that $S_a^t$= $C_{(j-1)mod |C_a|+1}$, where $c_j$ is a j$^{th}$ channel in the licensed channel set N. If $c_j \in C_a$, $S_a^t$=$c_j$. An element $S_a^t$ in the channel hopping sequence S of the unlicensed user a is returned, where S={$S_a^1$, $S_a^2$, . . . , $S_a^t$, . . . $S_a^P$}.

Figure 3:
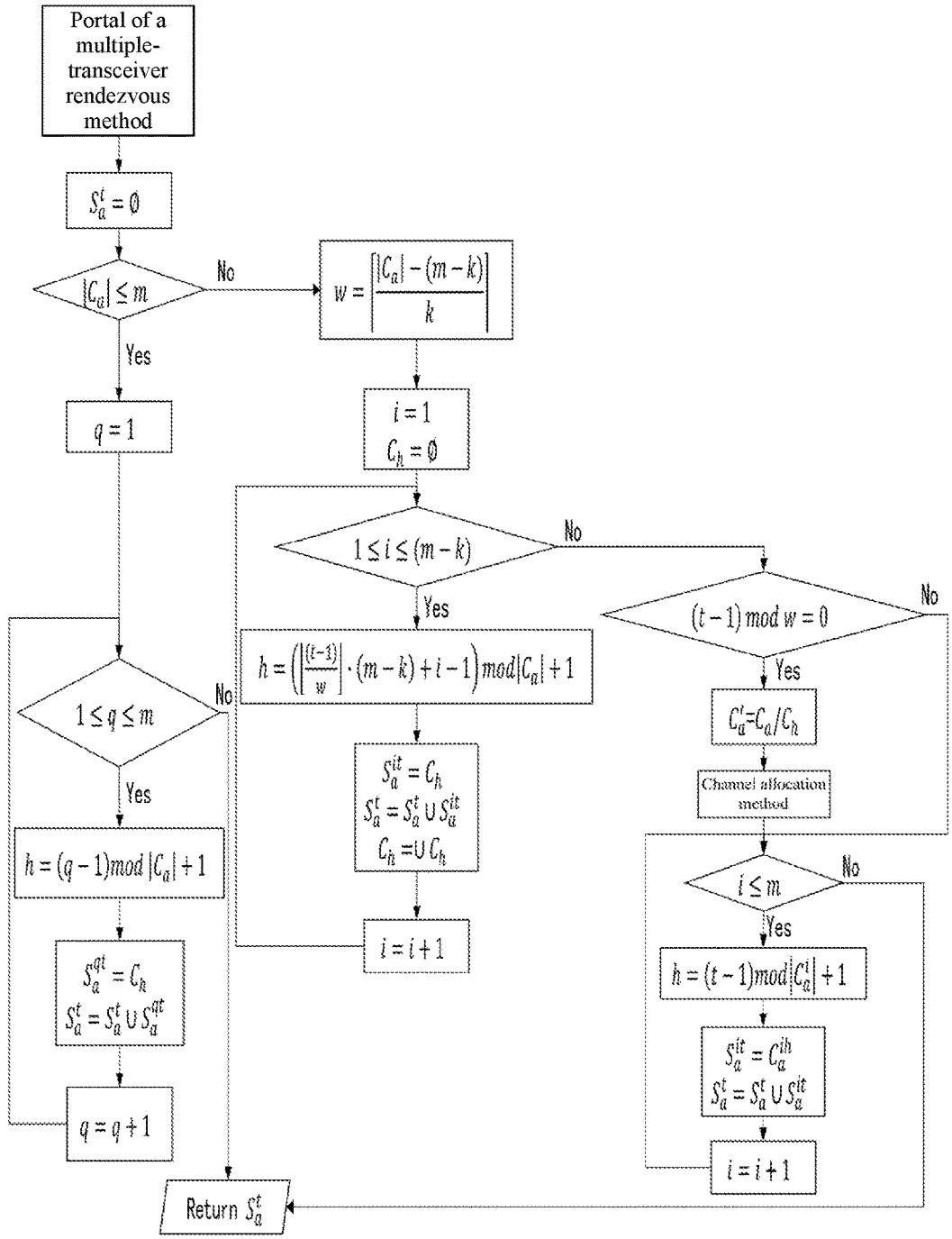
FIG. 3 is a flowchart of generating a channel hopping sequence by using a multiple-transceiver rendezvous method.

As shown in FIG. 3, a specific process of generating a channel hopping sequence by using the multiple-transceiver rendezvous algorithm may be summarized as follows. An element $S_a^t$=∅ in a channel hopping sequence is initialized first, where $S_a^t$={$S_a^{1t}$, $S_a^{2t}$, . . . , $S_a^{xt}$, . . . $S_a^{mt}$}, $S_a^{xt}$ is a channel on which an x$^{th}$ transceiver of an unlicensed user a runs in a t$^{th}$ timeslot, and m is the quantity of transceivers of the unlicensed user a. A relationship between the quantity of available channels of the unlicensed user and the quantity of transceivers of the unlicensed user is then determined. If |$C_a$|≤m, the transceivers of the unlicensed user are all stay transceivers. Each transceiver calculates a channel index h of a channel on which the transceiver stays according to h=(q−h=(q−1)mod |$C_a$|+1, where $S_a^{qt}$=$C_h$, q=1 to m represents a q$^{th}$ transceiver of the unlicensed user, and $C_h$ is an h$^{th}$ channel in $C_a$. If |$C_a$|>m, the length of a channel index sequence in each round is first calculated by using a formula $$w = \left\lceil \frac{|C_a| - (m-k)}{k} \right\rceil,$$

where k is the quantity of hopping transceivers of the unlicensed user. Next, if a transceiver i is a stay transceiver, a channel index of a channel hopping sequence of the transceiver i is generated according to $$h = \left(\left\lfloor \frac{t-1}{w} \right\rfloor \cdot (m-k) + i - 1\right) \bmod |C_a| + 1,$$

where $S_a^{it}$=$C_h$. If a transceiver i is a hopping transceiver, it is determined whether (t−1)mod w is 0. If (t−1)mod w=0, channel allocation is performed on an available channel set except a set of channels on which a stay transceiver stays, that is, C'$_a$=$C_a$/$C_h$. Elements in C'$_a$ are evenly allocated to k hopping transceivers, where $C_h$ is a set of channels on which the stay transceiver stays in the t$^{th}$ timeslot. If (t−1)mod w is not 0, the process skips this step to directly enter a next step. Subsequently, each hopping transceiver of the unlicensed user generates an index of a channel hopping sequence of the hopping transceiver according to h=(t−1)mod |$C_a^i$|+1, where $S_a^{it}$=$C_a^{ih}$, $C_a^i$ is a set of available channels allocated to an i$^{th}$ hopping transceiver, and |$C_a^i$| is the quantity of available channels allocated to the i$^{th}$ hopping transceiver, and $C_a^{ih}$ is an h$^{th}$ channel in $C_a^i$. An element $S_a^t$ in the channel hopping sequence is eventually returned.

Figure 4:
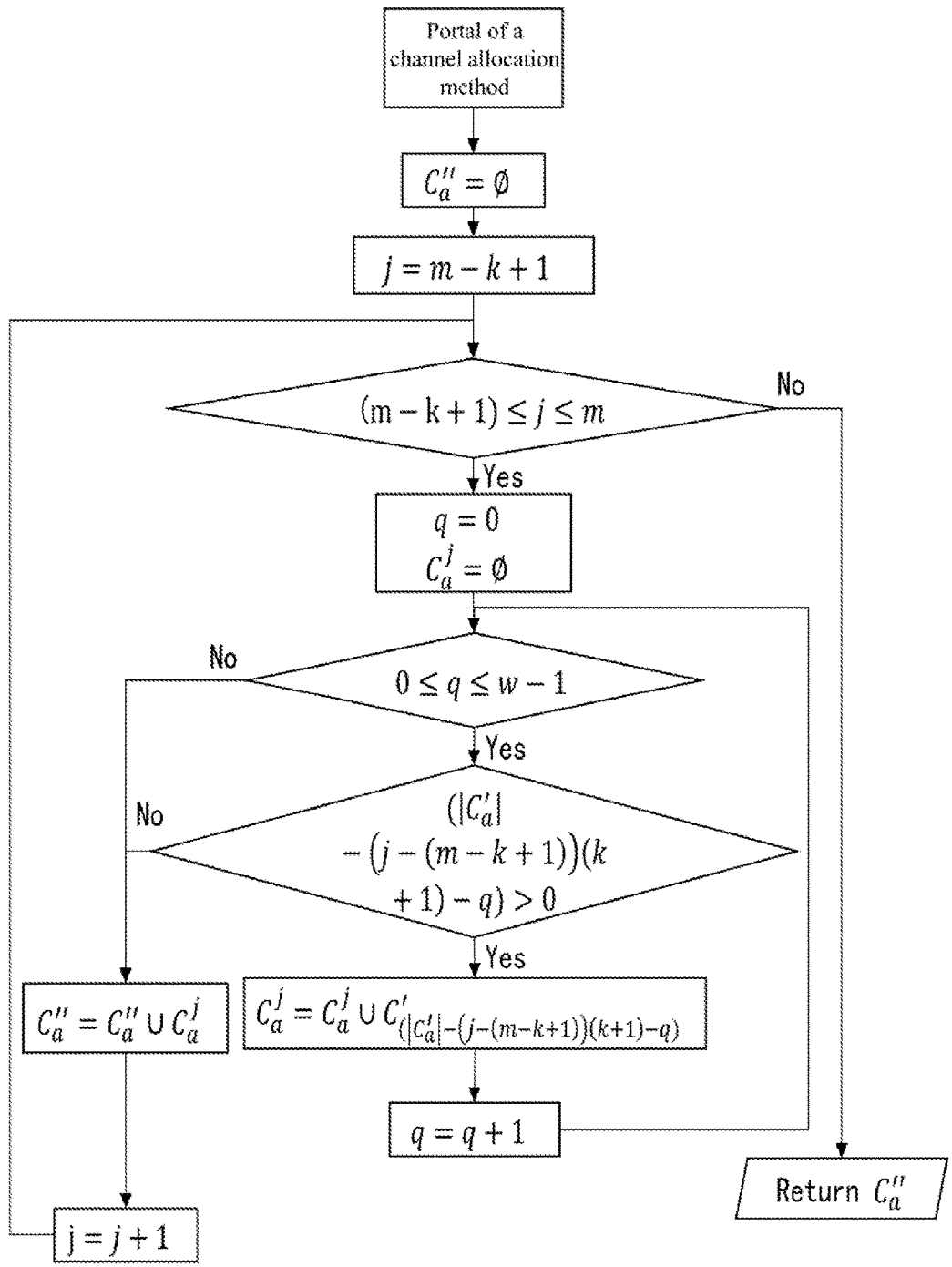
FIG. 4 is a flowchart of a channel allocation method.

As shown in FIG. 4, a process of allocating available spectrums may be summarized as follows. C'$_a$=∅ and j=m−k+1 are initialized, where C'$_a$={$C_a^1$, $C_a^2$, . . . , $C_a^j$, . . . , $C_a^m$}, and $C_a^j$ is a set of available channels allocated to a j$^{th}$ hopping transceiver. Next, a set of channels allocated to the j$^{th}$ transceiver is calculated: initializing q=0 and $C_a^j$=∅, and when q=0 to (w−1) and |C'$_a$|−(j−(m−k+1)(k+1)−q)>0, allocating elements in C'$_a$ evenly to the j$^{th}$ hopping transceiver according to a formula $C_a^j$=$C_a^j \cup C'_{|C'_a|-(j-(m-k+1)(k+1)-q)}$, where C'$_{|C'_a|-(j-(m-k+1)(k+1)-q)}$ is a channel whose index is |C'$_a$|−(j−(m−k+1)(k+1)−q) in C'$_a$, and |C'$_a$| is the quantity of C'$_a$. Eventually, C''$_a$ is returned.

What is claimed is:

1. A method for rendezvous of unlicensed users having multiple transceivers in cognitive radio networks, comprising four stages:
   (1) an initial stage: setting an initial environment for the method for rendezvous of unlicensed users;
   (2) a stage of selecting a rendezvous method: selecting a corresponding rendezvous method according to the quantity of transceivers that an unlicensed user is equipped with;
   (3) a stage of generating a channel hopping sequence: generating a channel hopping sequence by using the corresponding rendezvous method; and
   (4) a rendezvous stage: running, by the unlicensed user, on a corresponding channel according to the channel hopping sequence generated in the stage of generating a channel hopping sequence, and attempting to rendezvous with a destination node of the unlicensed user, wherein if rendezvous is achieved, the rendezvous process ends; and if rendezvous is not achieved, the rendezvous process continues until rendezvous is achieved.

2. The method for rendezvous of unlicensed users having multiple transceivers in cognitive radio networks according to claim 1, wherein the step of setting the initial environment for the method for rendezvous of unlicensed users in the stage (1) comprises:
   setting an initial timeslot t=1, randomly selecting an initial channel index i$_0$ from [1, |$C_a$|], randomly selecting one channel index value less than P from $C_a$ as a hopping interval s, and arranging $C_a$ and N in order according to channel quality, wherein N={$c_1$, $c_2$, . . . , $c_{|N|}$} is a licensed channel set, $C_a \in N$ is an available channel set of an unlicensed user a, |$C_a$| is the quantity of available channels of the unlicensed user a, and P is a minimum prime number not less than the quantity of licensed channels |N|.

3. The method for rendezvous of unlicensed users having multiple transceivers in cognitive radio networks according to claim 1, wherein two rendezvous methods in the stage (2)

comprise: a single-transceiver rendezvous method and a multiple-transceiver rendezvous method.

4. The method for rendezvous of unlicensed users having multiple transceivers in cognitive radio networks according to claim 1, wherein the step of selecting the corresponding rendezvous method according to the quantity of transceivers that the unlicensed user is equipped with in the stage (2) comprises: if the unlicensed user is equipped with one transceiver, selecting a single-transceiver rendezvous method to generate the channel hopping sequence; and if the unlicensed user is equipped with more than one transceiver, selecting a multiple-transceiver rendezvous method to generate the channel hopping sequence.

5. The method for rendezvous of unlicensed users having multiple transceivers in cognitive radio networks according to claim 4, wherein the step of using the single-transceiver rendezvous method to generate the channel hopping sequence comprise:

Step 5-1: adjustment of an initial channel index: when a new round of the channel hopping sequence begins, that is, when $y=(t-1)\bmod 5P=0$, adjusting an initial channel index according to $i=(i_0+n)$, wherein $n=(t-1)/5P$, and t is a $t^{th}$ timeslot in the channel hopping sequence;

Step 5-2: generation of the channel hopping sequence in a jump-pattern with the length of 2P timeslots: when $t'<2P$, generating a channel index of the channel hopping sequence in the jump-pattern by using a formula $j=((i+t'\cdot s-1)\bmod P)+1$ in the single-transceiver rendezvous method, wherein $t'=y=(t-1)\bmod 5P$;

Step 5-3: generation of the channel hopping sequence in a stay-pattern 1 with the length of P timeslots: when $2P\le t'<3P$, staying on a channel whose channel index is s in a single-transceiver rendezvous algorithm, that is, $j=s$ and $S_a^t=c_j$, wherein $S_a^t$ is a channel on which the unlicensed user a runs in the $t^{th}$ timeslot, and $c_j$ is a $j^{th}$ channel in N;

Step 5-4: generation of the channel hopping sequence in a stay-pattern 2 with the length of 2P timeslots: when $t'\ge 3P$, calculating a channel index in the stay-pattern 2 according to $j=n+1$ in a single-transceiver rendezvous algorithm;

Step 5-5: reallocation of a channel index: when the value of the channel index in the jump-pattern generated in step 5-2 or in the stay-pattern 2 generated in step 5-4 is $j>|N|$, replacing j with an index value of a $(((j-1)\bmod |N|)+1)^{th}$ channel in N; and if $j\le|N|$, keeping j unchanged;

Step 5-6: channel substitution: if a licensed channel corresponding to the value of the channel index j generated after step 5-5 is an unavailable channel for the unlicensed user a, that is, $c_j\notin C_a$, substituting the licensed channel corresponding to the channel index j with a $((j-1)\bmod |C_a|+1)^{th}$ channel in $C_a$, so that $S_a^t=C_{((j-1)\bmod |C_a|+1)}$; and if $c_j\in C_a$, $S_a^t=c_j$; and Step 5-7: a stage of returning a generated channel: returning an element $S_a^t$ in a channel hopping sequence S of the unlicensed user a, wherein $S=\{S_a^1, S_a^2, \ldots, S_a^t, \ldots S^P\}$.

6. The method for rendezvous of unlicensed users having multiple transceivers in cognitive radio networks according to claim 4, wherein the step of using the multiple-transceiver rendezvous method to generate the channel hopping sequence comprise:

Step 6-1: an initialization stage: initializing an element $S_a^t=\emptyset$ in a channel hopping sequence S, wherein $S=\{S_a^1, S_a^2 \ldots S_a^t\}$, $S_a^t$ is a channel on which the unlicensed user a runs in a $t^{th}$ timeslot, $S_a^t=\{S_a^{1t}, S_a^{2t}, \ldots, S_a^{xt}, \ldots S_a^{mt}\}$, $S_a^{xt}$ is a channel on which an $x^{th}$ transceiver of the unlicensed user a runs in the $t^{th}$ timeslot, and m is the quantity of transceivers of the unlicensed user a;

Step 6-2: determination of a relationship between the quantity of available channels of an unlicensed user and the quantity of transceivers of the unlicensed user: if $|C_a|\le m$, and the transceivers of the unlicensed user are all stay transceivers, calculating, by each transceiver, a channel index h of a channel on which the transceiver stays according to $h=(q-1)\bmod |C_a|+1$, wherein $S_a^{qt}=C_h$, $q=1$ to m represents a $q^{th}$ transceiver of the unlicensed user, and $C_h$ is an $h^{th}$ channel in $C_a$; and if $|C_a|>m$, generating the channel hopping sequence $S_a^t$ according to step 6-3 to step 6-6;

Step 6-3: calculation of the length of a channel index sequence in each round according to a formula $$w = \left\lceil \frac{|C_a|-(m-k)}{k} \right\rceil,$$

wherein k is the quantity of hopping transceivers of the unlicensed user a;

Step 6-4: a process of generating the channel hopping sequence by a stay transceiver: generating, by an $i^{th}$ stay transceiver of the unlicensed user, an index of the channel hopping sequence according to $$h = \left(\left\lfloor \frac{t-1}{w} \right\rfloor \cdot (m-k)+i-1\right)\bmod |C_a|+1,$$

wherein $S_a^{it}=C_h$;

Step 6-5: a channel allocation process of a hopping transceiver: determining whether the timeslot t is the beginning of a new round of the channel hopping sequence, that is, whether $(t-1)\bmod w$ is 0, wherein if $(t-1)\bmod w$ is 0, performing channel allocation on an available channel set except a set of channels on which a stay transceiver stays, that is, $C'_a=C_a/C_h$, and allocating elements in $C'_a$ evenly to k hopping transceivers, $C_h$ being a set of channels on which the stay transceiver stays in the $t^{th}$ timeslot; and if $(t-1)\bmod w$ is not 0, the process directly enters step 6-6;

Step 6-6: a process of generating the channel hopping sequence by a hopping transceiver: generating, by an $i^{th}$ hopping transceiver of the unlicensed user, an index of the channel hopping sequence of the $i^{th}$ hopping transceiver according to $h=(t-1)\bmod |C_a^i|+1$, wherein $S_a^{it}=C_a^{ih}$, $C_a^i$ is a set of available channels allocated to the $i^{th}$ hopping transceiver, $|C_a^{ih}|$ is the quantity of available channels allocated to the $i^{th}$ hopping transceiver, and $C_a^{ih}$ is an $h^{th}$ channel in $C_a^i$; and Step 6-7: a stage of returning a channel hopping sequence value: returning an element $S_a^t$ in the channel hopping sequence.

7. The method for rendezvous of unlicensed users having multiple transceivers in cognitive radio networks according to claim 6, wherein the step of performing channel allocation on the channels except the set of the channels on which the stay transceiver stays, that is, $C'_a=C_a/C_h$, in step 6-5 comprise:

Step 7-1: an initialization stage: initializing $C''_a = \emptyset$ and $j = m-k+1$, wherein $C''_a = \{C_a^1, C_a^2, \ldots, C_a^j, \ldots, C_a^m\}$, and $C_a^j$ is a set of available channels allocated to a $j^{th}$ hopping transceiver;

Step 7-2: calculation of a set of channels allocated to the $j^{th}$ transceiver: initializing $q=0$ and $C_a^j = \emptyset$, and when $q=0$ to $(w-1)$ and $|C'_a| - (j-(m-k+1)(k+1)-q) > 0$, allocating elements in $C'_a$ evenly to the $j^{th}$ hopping transceiver according to a formula wherein $C_a^j = C_a^j \cup C'_{|C'_a|-(j-(m-k+1)(k+1)-q)}$, wherein $C'_{|C'_a|-(j-(m-k+1)(k+1)-q)}$ is a $(|C'_a|-(j-(m-k+1)(k+1)-q))^{th}$ channel in $C'_a$, and $|C'_a|$ is the quantity of channels in $C'_a$; and Step 7-3: a stage of returning a set of allocated channels: returning $C''_a$.

* * * * *